(12) United States Patent
Hung et al.

(10) Patent No.: US 7,218,381 B2
(45) Date of Patent: May 15, 2007

(54) OPTICAL MECHANISM FOR INCREASING OPTICAL PATH AND OFFICE MACHINE HAVING SAID OPTICAL MECHANISM

(75) Inventors: Ming Te Hung, Pan Chiao (TW); Shu-Yu Chiang, Tai Chung (TW); Yu-Jen Su, Taipei (TW); Tien-Ho Hsu, Chang Hua Hsien (TW)

(73) Assignee: Lite-On Technology Corporation, Taipei (TW)

( * ) Notice: Subject to any disclaimer, the term of this patent is extended or adjusted under 35 U.S.C. 154(b) by 564 days.

(21) Appl. No.: 10/821,929

(22) Filed: Apr. 12, 2004

(65) Prior Publication Data

US 2005/0046907 A1    Mar. 3, 2005

(30) Foreign Application Priority Data

Aug. 29, 2003    (TW) ............................... 92215751 U

(51) Int. Cl.
*G03B 27/52* (2006.01)
*G03B 27/62* (2006.01)
*G03G 15/04* (2006.01)
*H04N 1/04* (2006.01)

(52) U.S. Cl. ..................... 355/55; 355/75; 358/474; 358/482; 358/498

(58) Field of Classification Search ............... 355/44, 355/55; 358/471, 482, 483, 498, 505, 513, 358/514; 399/365
See application file for complete search history.

(56) References Cited

U.S. PATENT DOCUMENTS

| 5,973,814 A * | 10/1999 | Ohtake et al. ............... 359/210 |
| 6,188,465 B1 * | 2/2001 | Rees et al. .................... 355/55 |
| 2006/0061839 A1 * | 3/2006 | Hiraoka et al. ............. 358/498 |

* cited by examiner

*Primary Examiner*—W. B. Perkey
(74) *Attorney, Agent, or Firm*—Birch, Stewart, Kolasch & Birch, LLP

(57) ABSTRACT

An optical mechanism installed in an office machine, which has a machine base defining an internal space, and a paper-feeding mechanism arranged on the machine base, the paper-feeding mechanism having an inside receiving space and a bottom incident zone for the passing of light. The optical mechanism has an optical-path device formed of an image sensor and an optical module and mounted in the internal space inside the machine base, and a light-focusing structure mounted in the receiving space inside the paper-feeding mechanism above the incident zone for increasing optical path.

17 Claims, 5 Drawing Sheets

OPTICAL MECHANISM FOR INCREASING OPTICAL PATH AND OFFICE MACHINE HAVING SAID OPTICAL MECHANISM

This Nonprovisional application claims priority under 35 U.S.C. 119(a) on patent application Ser. No(s). 92215751 filed in Taiwan on Aug. 29, 2003, the entire contents of which are hereby incorporated by reference.

BACKGROUND OF THE INVENTION

1. Field of the Invention

The present invention relates generally to an optical mechanism for use in an office machine, for example, a copy machine or scanner and, more particularly, to such an optical mechanism that increases the optical path of the office machine.

2. Description of the Related Art

A paper-feeding type office machine, for example, a copy machine or scanner, as shown in FIG. 1, generally comprises a paper-feeding mechanism 10 which comprises a sheet-transferring mechanism 12, which is adapted to transfer paper 11, and a machine base 20, which is disposed on the bottom side of the paper-feeding mechanism 10. The machine base 20 comprises a document carrier glass 22, which is disposed on the top side, an optical-path device 30m which is disposed on the inside. Document carrier glass 22 has a scanning zone 25 near one side. The optical-path device 30, for example, a charge-coupled device, comprises an image sensor 32, which is adapted to convert a light signal into an electric signal that is further proceeded with and is stored by an electronic device, and an optical module 34, which comprises a light source that provides a scanning light to the scanning zone 25 for scanning a document, and which comprises a lens set adapted to focus reflected light onto the image sensor 32. The paper-feeding mechanism 10 has a scanning hole 17 in the bottom panel 16 for enabling paper 11 to be transferred to the scanning zone 25 and then back to the topside of the paper-feeding mechanism 10. Another design is possible, in which document is delivered sideways from the surface of the document carrier glass 22.

According to this design of office machine, paper 11 must be kept in close contact with the scanning zone 25 to match the focus 36 of the optical-path device 30. This close contact makes the structural design difficult, and does not allow the paper-feeding mechanism 10 to have much internal space for holding component parts of the machine. Further, because the sheet-transferring mechanism 12 must be kept as close to the bottom panel 16 as possible, the design of the arrangement of the internal component parts in the sheet-transferring mechanism 12 is complicated and difficult.

Therefore, it is desirable to provide an optical mechanism for use in an office machine, which increases the optical path to facilitate the arrangement of internal component parts.

SUMMARY OF THE INVENTION

The present invention has been accomplished under the circumstances in view. It is the main object of the present invention to provide an optical mechanism for use in an office machine, which increases the optical path to provide a large amount of space for a document-transferring mechanism to facilitate the arrangement of internal component parts. It is another object of the present invention to provide an optical mechanism which improves document transferring path to stabilize the scanning quality of the office machine, making image pick-up more accurate and clearer.

The optical mechanism is installed in an office machine, which has a machine base defining an internal space, and a paper-feeding mechanism arranged on the machine base. The paper-feeding mechanism has an inside receiving space, and a bottom incident zone for the passing of light. The optical mechanism comprises an optical-path device, which is formed of an image sensor and an optical module and mounted in the internal space inside the machine base, and a light-focusing structure mounted in the receiving space inside the paper-feeding mechanism above the incident zone for increasing optical path.

DETAILED DESCRIPTION OF THE INVENTION

Figure 1:
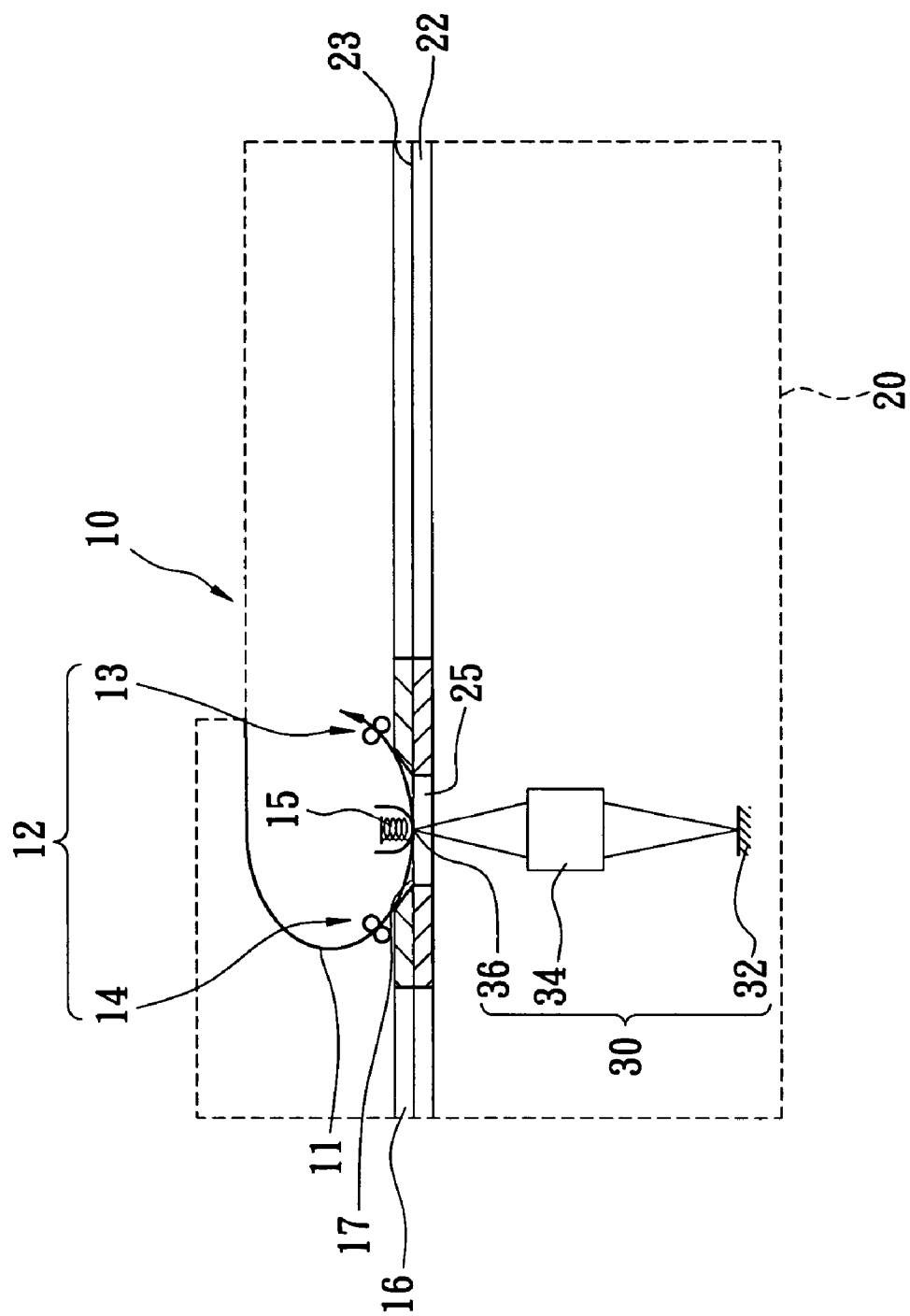
FIG. 1 is a schematic drawing of a paper-feeding type office machine according to the prior art.
Figure 2:
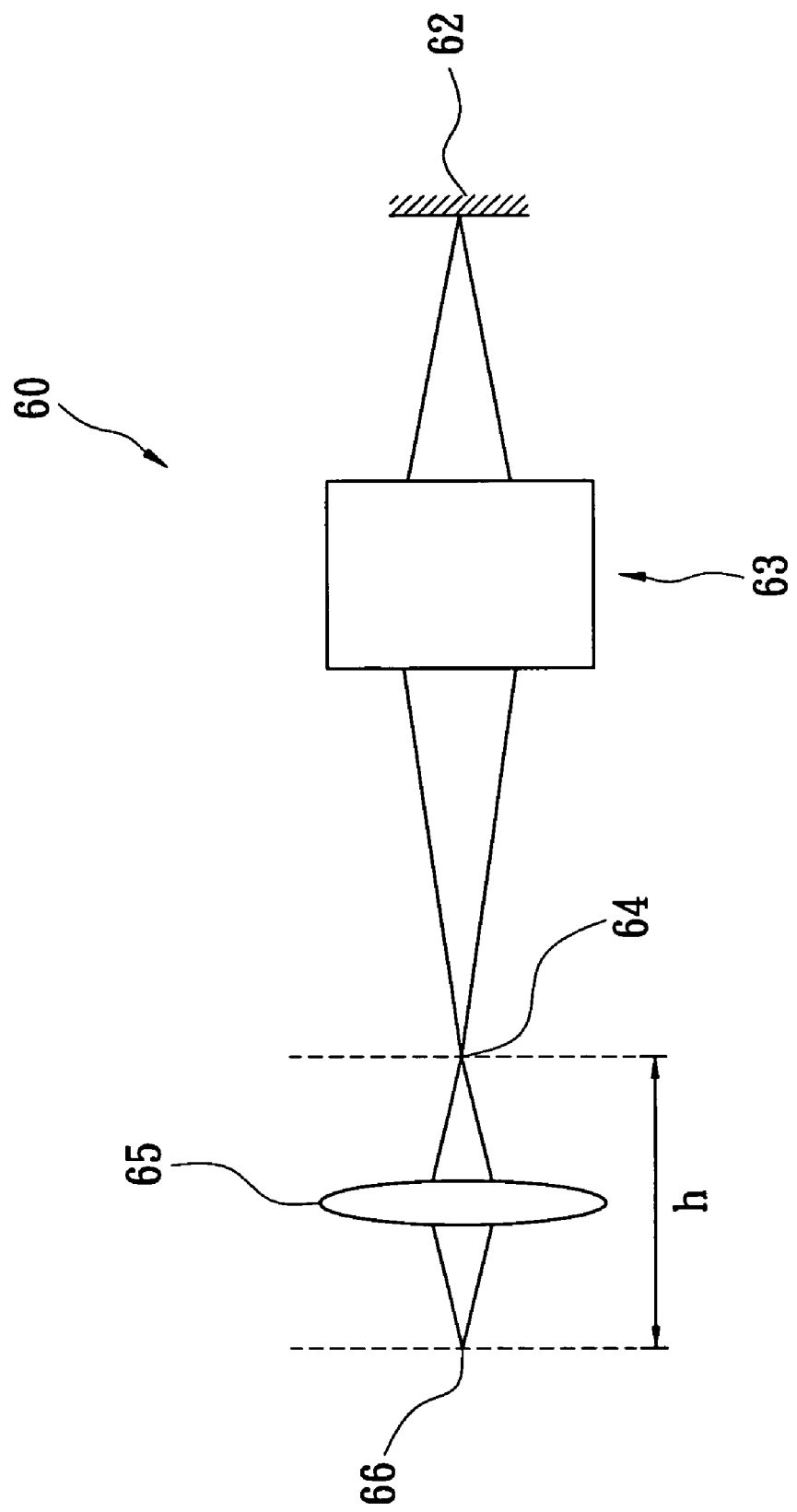
FIG. 2 is a schematic drawing of an optical mechanism for increasing optical path according to the present invention.

Referring to FIG. 2, an optical mechanism for increasing optical path in accordance with the present invention is shown, which comprises an optical-path device 60 and a light-focusing structure 65. The optical-path device 60 comprises an image sensor 62 and an optical module 63 for providing a scanning light. The light-focusing structure 65 is set in the optical path between the optical module 63 of the optical-path device 60 and the document to be scanned. The scanning light of the optical-path device 60 is focused and thus, forms a front focus 64. The light which passes through the front focus 64, and thus is dispersed, is focused on again and thus, forms a rear focus 66 through using the light-focusing structure 65. The rear focus 66 is the position for the document to be scanned. By means of the aforesaid arrangement, an optical path h between the front focus 64 and the rear focus 66 is added to the space that accommodates a document conveyer. In FIG. 2, a lens is used to indicate the light-focusing structure 65. In actual practice, the light-focusing structure 65 can be comprised of at least one convex lens, or any of a variety of light-focusing means to focus the dispersed light which passes through the front focus, onto the rear focus 66.

Figure 3:
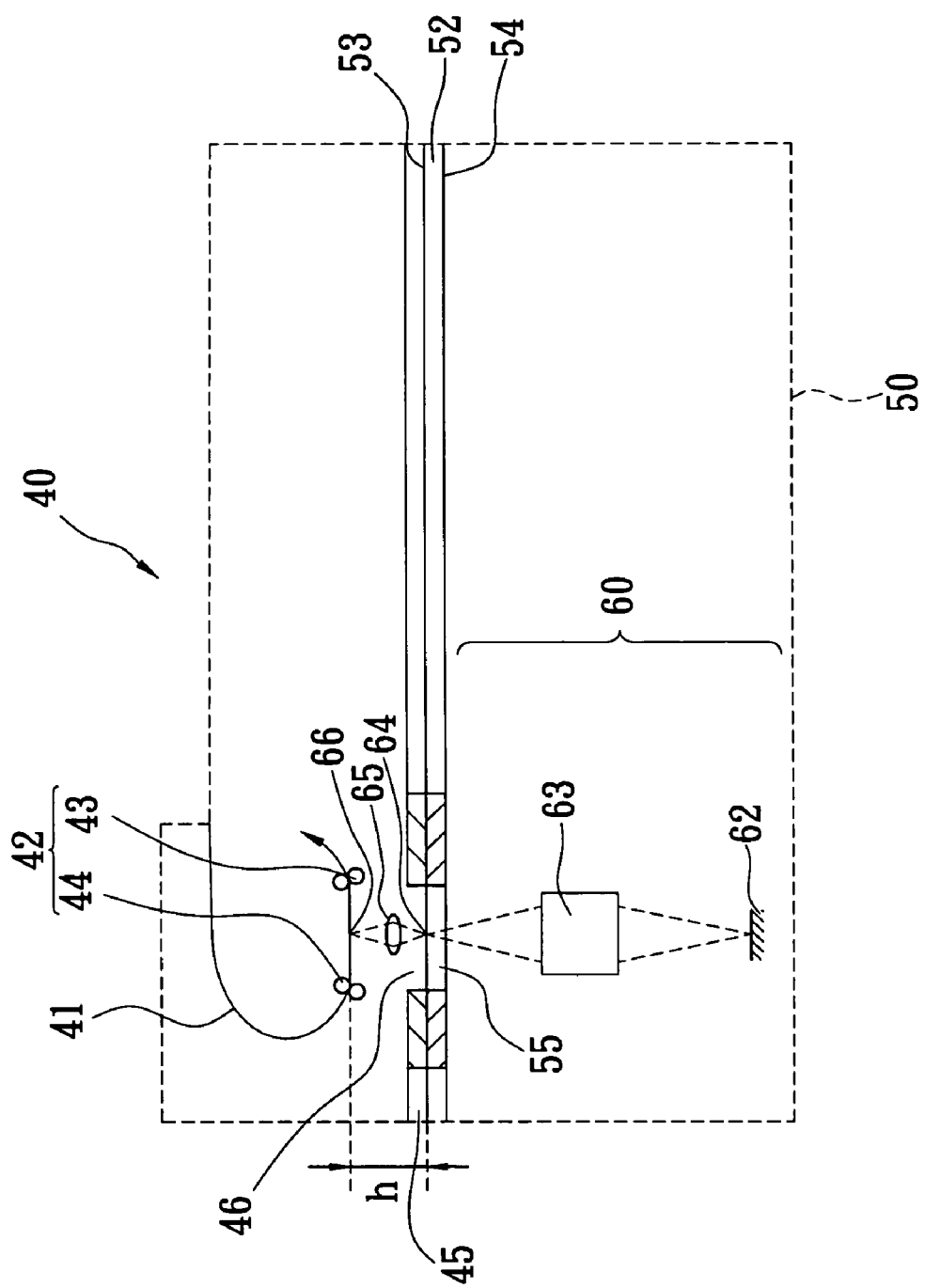
FIG. 3 is a schematic drawing of an office machine constructed according to the present invention.

FIG. 3 shows an office machine constructed according to the present invention, in which the office machine can be a copy machine or scanner comprising a paper-feeding mechanism 40, and a machine base 50 supporting the paper-feeding mechanism 40. The paper-feeding mechanism 40 defines therein a receiving space. The machine base 50 has an internal space on the bottom side thereof. The paper-feeding mechanism 40 comprises a sheet-transferring mechanism 42 which is adapted to transfer the document to be scanned 41, a bottom panel 45 which defines an incident zone 46, and a light-focusing structure 65 which is mounted in the receiving space inside the paper-feeding mechanism 40 and is set above the incident zone 46. The incident zone 46 can be a transparent material, or an opening for letting the scanning light pass therein. The machine base 50 comprises a document carrier glass 52 defining a scanning zone 55, and the optical-path device 60 mounted on the inside. The optical-path device 60 comprises an image sensor 62 and an optical module 63. The light-focusing structure 65 is set in the optical path between the optical module 63 of the optical-path device 60 and the document to be scanned 41.

The light which passes through the optical-path device 60 is focused onto the front focus 64 on the surface 53 of the document carrier glass 52. The light-focusing structure 65 is disposed between the front focus 64 of the optical-path device 60 and the document to be scanned 41, and focuses the dispersed light which passes through the front focus 64, onto the rear focus 66. The rear focus 66 is the scanning position of the document 41 to be scanned. The sheet-transferring mechanism 42 is disposed in proximity to the rear focus 66. The present invention increases the total optical path using the light-focusing structure. The extended optical path facilitates accurate arrangement of related component parts of the machine. The sheet-transferring mechanism 42 can be comprised of one single pair of transferring wheels 43 and 44 arranged in parallel on two sides of the rear focus 66 without any means to impress the document. After being scanned, the document 41 is sent onto the top side of the paper-feeding mechanism 40. Alternatively, the document can be sent out of one side of the top surface 53 of the document carrier glass 52 after being scanned. These different document-transferring structures are obvious to any person skilled in the art. No further detailed description or drawing thereof is necessary.

Figure 4:
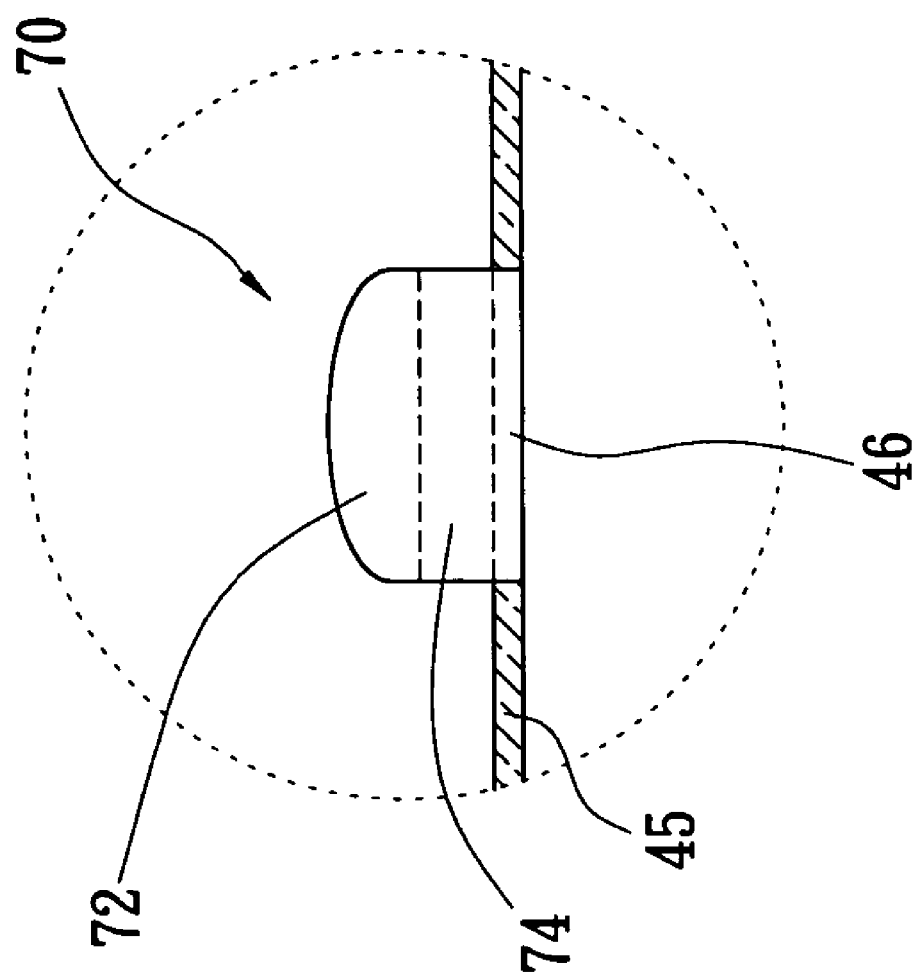
FIG. 4 shows a first example of the light-focusing structure for the optical mechanism according to the present invention.

FIG. 4 shows an example of the light-focusing structure. According to this design, the incident zone 46 of the paper-feeding mechanism 40 is formed of transparent material. The light-focusing structure 70 comprises an extension portion 74 formed integral with and upwardly extended from the incident zone 46 of the paper-feeding mechanism 40, and a protruding portion 72 is provided on the top side of the extension portion 74.

Figure 6:
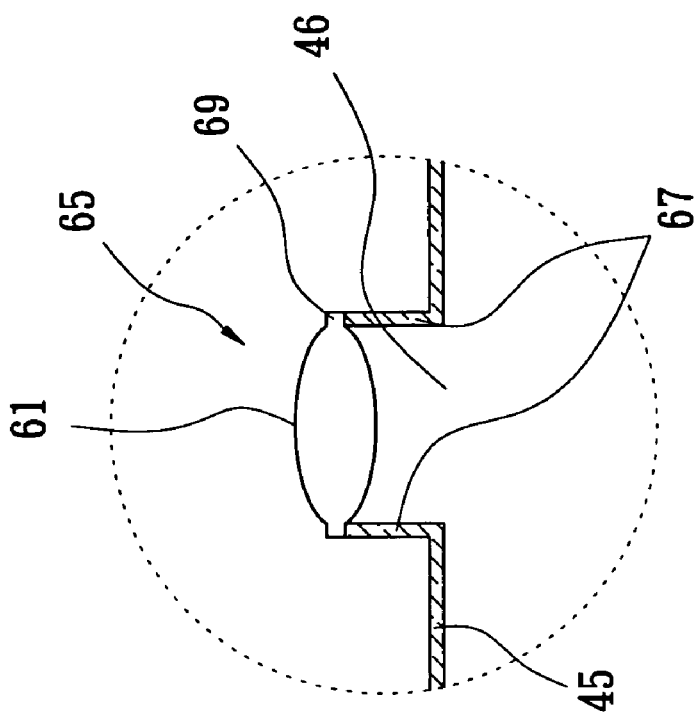
FIG. 6 shows a third example of the light-focusing structure for the optical mechanism according to the present invention.
Figure 5:
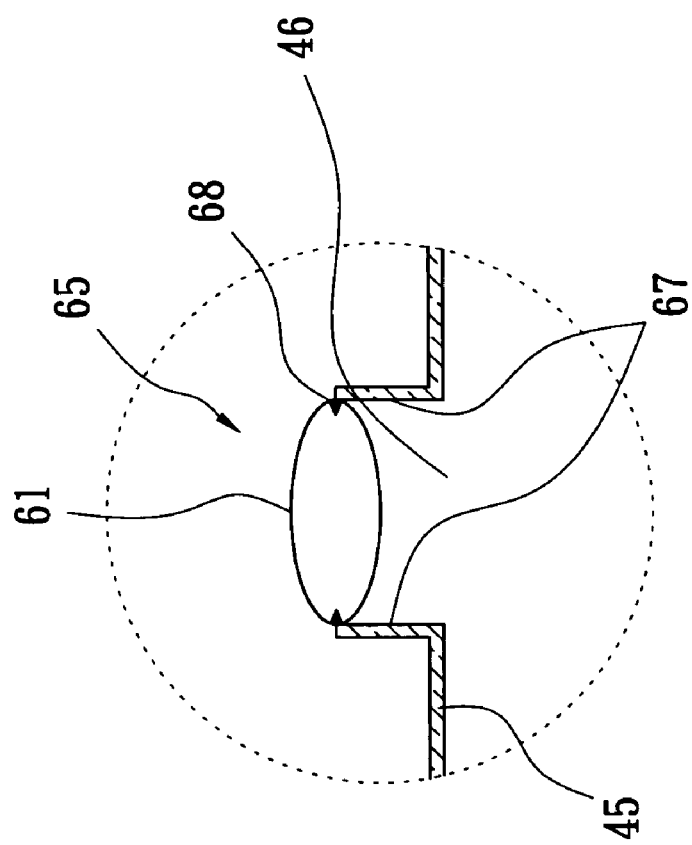
FIG. 5 shows a second example of the light-focusing structure for the optical mechanism according to the present invention.

FIGS. 5 and 6 show another two different examples of the light-focusing structure. As illustrated, the incident zone 46 of the paper-feeding mechanism 40 is an opening. The light-focusing structure 65 comprises a hollow locating device 74, which is disposed on two sides of the incident zone 46 and which is upwardly extended from the bottom panel 45 of the paper-feeding mechanism 40, and a condensing lens set 61, which is formed of at least one convex lens and fastened or adhered to the locating device 74. The condensing lens set 61 comprises a mounting groove 68, which is adapted to receive the flanged top side of the locating device 74 (see FIG. 5), or two mounting flanges 69, which are positioned on the top side of the locating device 74 (see FIG. 6). The condensing lens set 61 can be molded of plastics by a precision injection-molding machine.

As indicated above, the optical mechanism of the present invention increases the optical path by a distance h, which makes arrangements and designs of image pick-up means and of the scanning position easier and more precise.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An optical mechanism for increasing the optical path, installed in an office machine, comprising a machine base defining an internal space, and a paper-feeding mechanism arranged on said machine base, said paper-feeding mechanism having a receiving space on the inside and an incident zone on a bottom side thereof for passing of light, the optical mechanism comprising:

an optical-path device mounted in the internal space inside said machine base, said optical-path device comprising an image sensor and an optical module; and a light-focusing structure mounted in the receiving space inside said paper-feeding mechanism and set above said incident zone.

2. The optical mechanism as claimed in claim 1, wherein said machine base comprises a document carrier glass disposed on a top side thereof, in which said optical module provides a scan light focused onto a front focus on a top surface of said document carrier glass, and said light-focusing structure is disposed above said front focus and adapted to focus a dispersed light, which passes through said front focus, onto a rear focus, through which the document to be scanned passes.

3. The optical mechanism as claimed in claim 1, wherein said incident zone is formed of a transparent material, and said light-focusing structure is a convex lens formed integral with and upwardly extended from said incident light.

4. The optical mechanism as claimed in claim 1, wherein said incident zone is an opening, said light-focusing structure comprises a hollow locating device disposed on two sides of said incident zone and upwardly extended from a bottom panel of said paper-feeding mechanism, and a focusing lens set is mounted in said hollow locating device.

5. An optical mechanism for increasing the optical path, mounted on the top side of the machine base of an office machine, said machine base comprising a document carrier glass disposed at a top side and an optical-path device disposed on an inside thereof, said optical-path device forming a front focus on a top surface of said document carrier glass, said paper-feeding mechanism comprising:

a receiving space and a sheet-transferring mechanism mounted on the inside; and a light-focusing structure mounted in said receiving space and set above said front focus of said optical-path device, said light-focusing structure forming a rear focus, and said sheet-transferring mechanism being adapted to transfer the document to be scanned, through said rear focus.

6. The optical mechanism as claimed in claim 5, wherein said paper-feeding mechanism has an incident zone disposed on a bottom side thereof in proximity to and below said front focus.

7. The optical mechanism as claimed in claim 6, wherein said incident zone is formed of a transparent material, and said light-focusing structure comprises a convex lens formed integral with and upwardly extended from said incident zone of said paper-feeding mechanism.

8. The optical mechanism as claimed in claim 6, wherein said incident zone is an opening, and said light-focusing structure comprises a hollow locating device upwardly extended from a bottom panel of said paper-feeding mechanism and a focusing lens set mounted in said hollow locating device.

9. An office machine for increasing the optical path, comprising:
- a machine base, said machine base comprising an optical-path device mounted on the inside thereof, said optical-path device comprising an image sensor and an optical module, said optical module providing a scan light forming a front focus; and
- a paper-feeding mechanism mounted on said machine base and set above said front focus, said paper-feeding mechanism comprising a receiving space and at least one light-focusing structure mounted in said receiving space.

10. The office machine as claimed in claim 9, wherein the office machine is a copy machine.

11. The office machine as claimed in claim 9, wherein the office machine is a scanner.

12. The office machine as claimed in claim 9, wherein said paper-feeding mechanism has an incident zone disposed on a bottom side thereof in proximity to and below said front focus.

13. The optical mechanism as claimed in claim 12, wherein said incident zone is formed of a transparent material, and said light-focusing structure comprises a convex lens formed integral with and upwardly extended from said incident zone of said paper-feeding mechanism.

14. The optical mechanism as claimed in claim 12, wherein said incident zone is an opening, and said light-focusing structure comprises a hollow locating device upwardly extended from a bottom panel of said paper-feeding mechanism and a focusing lens set mounted in said hollow locating device.

15. The optical mechanism as claimed in claim 14, wherein said focusing lens set of said light-focusing structure comprises at least one convex lens fastened to a top side of said hollow locating device.

16. The optical mechanism as claimed in claim 15, wherein said at least one convex lens each has a locating groove, and said hollow locating device has a flanged top engaging said locating groove of each said convex lens.

17. The optical mechanism as claimed in claim 15, wherein said at least one convex lens each has two flanges disposed on two sides and respectively positioned on the top side of said hollow locating device.

* * * * *